July 1, 1958  R. M. WILLIAMSON  2,841,163
CONTROL APPARATUS
Filed Feb. 20, 1956  3 Sheets-Sheet 1

INVENTOR.
REGINALD M. WILLIAMSON
BY
*Francis A. Sim*
ATTORNEY

INVENTOR.
REGINALD M. WILLIAMSON

United States Patent Office 2,841,163
Patented July 1, 1958

2,841,163

CONTROL APPARATUS

Reginald M. Williamson, New Hope, Minn., assignor to Minneapolis-Honeywell Regulator Company, Minneapolis, Minn., a corporation of Delaware Application February 20, 1956, Serial No. 566,496

10 Claims. (Cl. 137—98)

The present invention is concerned with a control apparatus for use with a craft to indicate the magnitude of the controllable loads of the craft and to control the center of gravity of the craft by controlling the individual magnitudes of the controllable loads. More specifically, the present invention is concerned with a control apparatus for use with an aircraft to measure the total quantity of fuel in the fuel tanks of the aircraft and to control the withdrawing of fuel from the individual fuel tanks to maintain the center of gravity of the aircraft about a given axis of the aircraft.

The advent of high speed and long range aircraft has necessitated the placing of fuel tanks throughout the aircraft and many times in a position which is quite remote from the desired center of gravity of the aircraft. Also the fuel weight of this type of an aircraft makes up a large portion of the total weight of the craft. Therefore, unless this weight is distributed in a certain manner the center of gravity of the craft may be shifted to contribute to unstable flight of the craft.

The basic design of an aircraft yields a Mean Aerodynamic Curve for the craft and it has been determined that the center of gravity of the craft must be kept within a predetermined range in this Mean Aerodynamic Curve in order to have the most economical and the most stable flight.

It is therefore an object of the present invention to provide an improved control apparatus which will both measure the total quantity of fuel aboard the aircraft and which will control the center of gravity of the aircraft.

It is a further object of the present invention to provide a control apparatus having fuel quantity measuring means which are cycled by means of a cycling switch between a total fuel quantity measuring network and a center of gravity measuring network.

It is a further object of the present invention to provide an improved control apparatus for use with a craft to measure the total magnitude of the controllable loads of the craft and to control these loads to maintain the center of gravity of the craft within a desired range.

Figure 1:
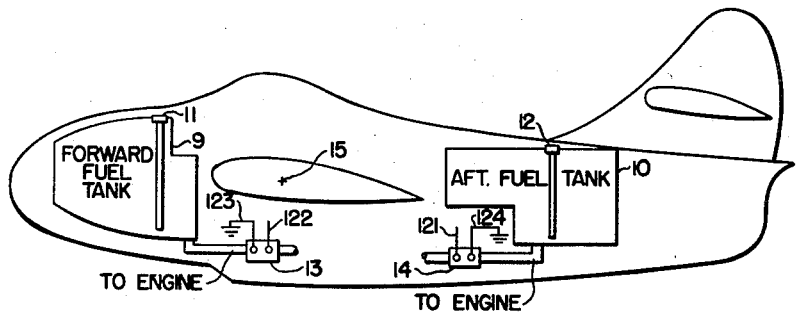
Figures 2, 3:
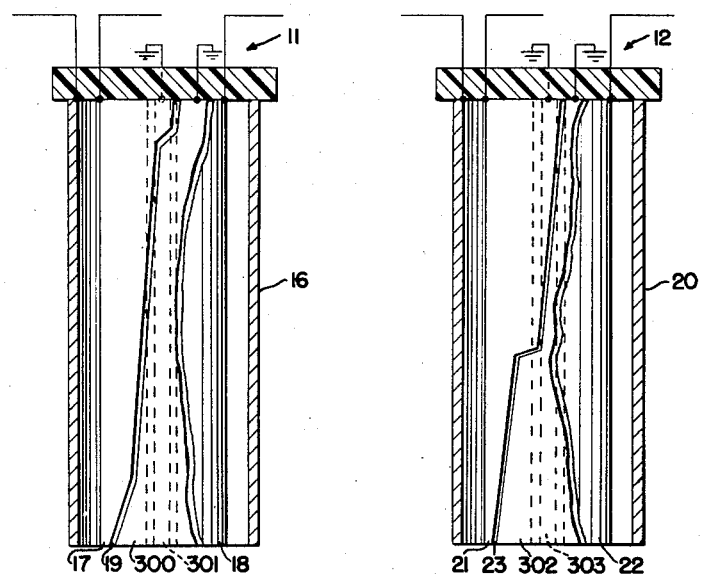
Figure 4:
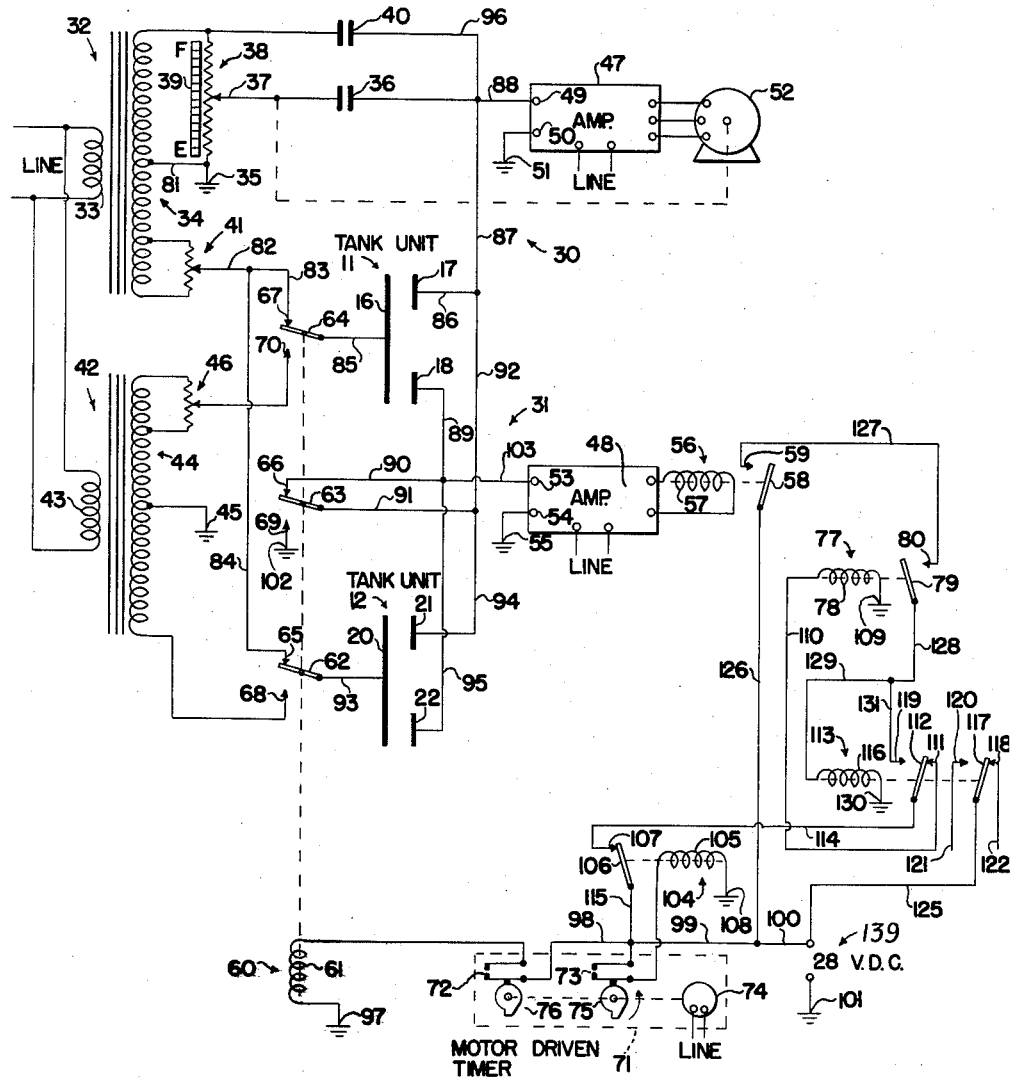
Figure 5:
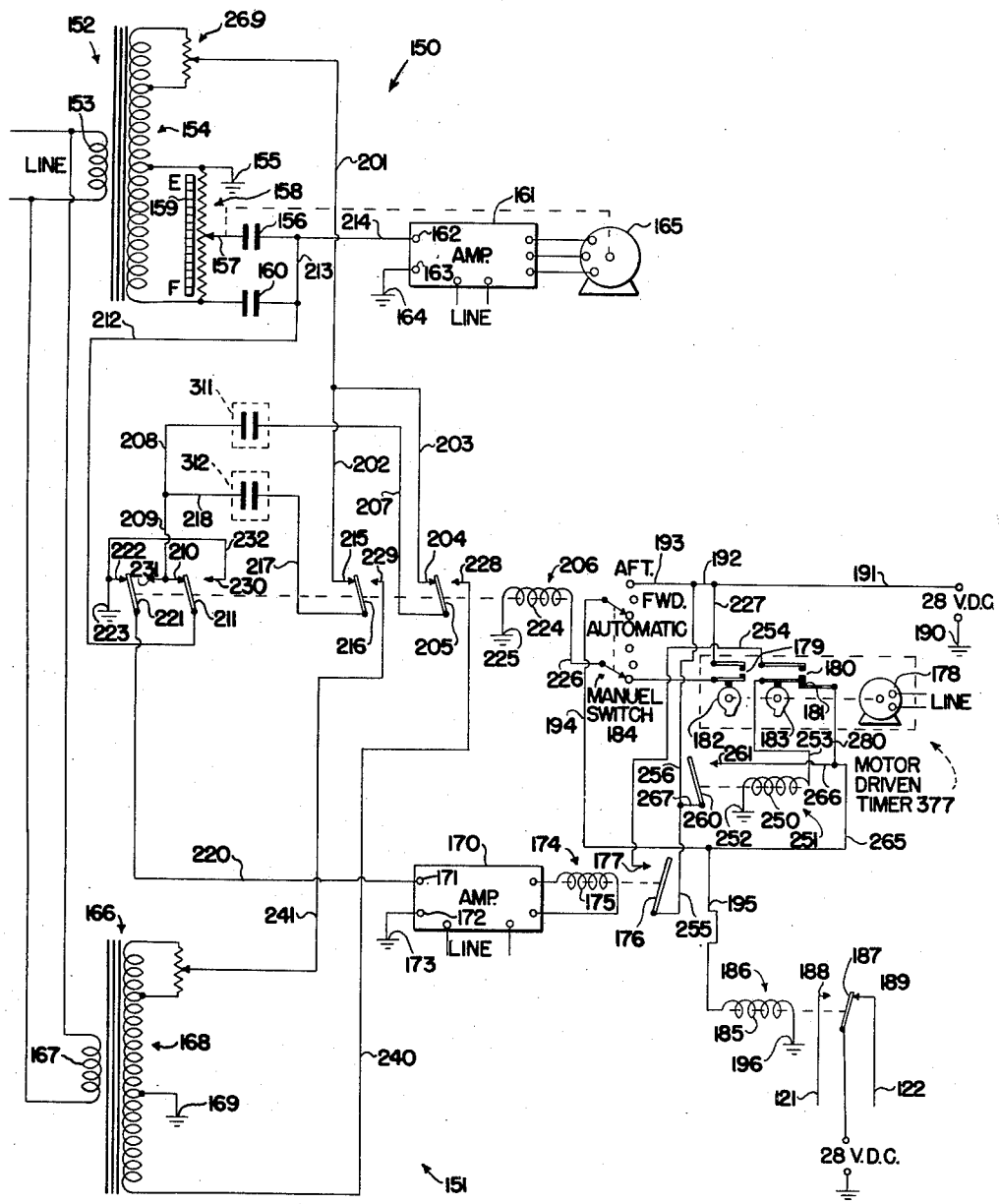

These and other objects of the present invention will be apparent to those skilled in the art upon reference to the following specification, claims, and drawings of which;

Figure 1 is a showing of an aircraft showing forward and aft fuel tanks,

Figure 2 is a showing of a capacitance type tank unit which may be used with a modification of the present invention, Figure 3 is a showing of a further capacitance type tank unit to be used with a modification of the present invention, Figure 4 is a schematic showing of a first modification of the present invention utilizing the capacitance type tank units of Figures 2 and 3, and Figure 5 is a schematic showing of a further modification of the present invention.

Referring specifically to Figure 1, the silhouette of an aircraft having a forward fuel tank 9 and an aft fuel tank 10 is shown. It will be noted that the fuel tanks 9 and 10 are not of uniform cross section. The reference numerals 11 and 12 designate capacitance type tank units which have a capacitance value determined by the height of the fuel in the fuel tanks 10 and 9. The reference numerals 13 and 14 designate fuel valves which are positioned in the outlet conduits from the tanks 9 and 10 and control the supply of fuel to the aircraft engines, allowing fuel to flow from the respective fuel tanks when the respective valves are energized, as will be described. The reference numeral 15 designates an imaginary axis of the aircraft about which it is desired to control the center of gravity of the craft by controlling the moment of the fuel in the forward and aft fuel tanks with respect to this axis.

The capacitance type tank units 11 and 12 may be of the type shown in the Earl C. Bowar Patent 2,560,757. This patent shows a tank unit which measures the quantity of fuel in the fuel tank in which it is positioned.

Figures 2 and 3 show a type tank unit which may be used with the forward and aft fuel tanks respectively. Figure 2 is representative of the tank unit 11. This tank unit includes an outer cylinder of metal 16 which is a common capacitor electrode to the two electrodes 17 and 18. Capacitor electrodes 17 and 18 are of metal and are plated on a plastic cylinder of electrically insulating material 19. Electrodes 300 and 301, also of metal, are connected to ground.

Figure 3 shows the form which the tank unit 12 in the aft fuel tank may take and this tank unit consists of an outer cylinder of metal 20 which comprises a capacitor electrode which is common to the capacitor electrodes 21 and 22. The capacitor electrodes 21 and 22 are films of metal which are deposited on a plastic cylinder of electrically insulating material 23. Electrodes 302 and 303, also of metal are connected to ground.

The tank units of Figures 2 and 3 are constructed and arranged so that when the second and third electrodes, that is electrodes 17 and 18 of Figure 2 and electrodes 21 and 22 of Figure 3, are connected in parallel they form a single electrode which in combination with the first electrode, or common electrode 16 and 20 of Figures 2 and 3 respectively, form a capacitor having a capacitance which is indicative of the quantity of fuel in the fuel tanks 9 and 10 respectively. However, as will be described in connection with Figure 4, at a certain point in the operation of the control apparatus the second capacitor electrode, that is electrodes 17 and 21 of Figures 2 and 3 respectively, are connected to ground. In this mode of operation the capacitors consisting of the common electrode 16 and the third electrode 18 of Figure 2 and the common electrode 20 and the third electrode 22 of Figure 3 have a capacitance value which is indicative of the moment of the fuel in the forward and aft fuel tanks 10 and 11 respectively with respect to the axis 15.

Referring specifically to Figure 4, the tank units 11 and 12 are shown in schematic form wherein the common electrodes, or first electrodes 16 and 20, are associated with the second electrodes 17 and 21 and the third electrodes 18 and 22 of the respective tank units.

The reference numeral 30 generally designates a total fuel quantity measuring network means while the reference numeral 31 generally designates a center of gravity measuring network means. The fuel quantity measuring network means 30 includes a source of alternating voltage in the form of a transformer 32 having a primary winding 33 which is connected to a source of alternating voltage, not shown, and having a secondary winding 34 with a tap connected to ground at ground connection 35, and having a pair of end terminals which are of opposite phase with respect to ground.

The fuel quantity measuring network means 30 is a rebalanceable type capacitance bridge network having a rebalance capacitor 36 connected to a tap 37 of a rebalance potentiometer 38. Tap 37 cooperates with a total fuel quantity indicator scale 39 to indicate the total quantity of fuel in the fuel tanks 9 and 10. The fuel quantity measuring network means 30 also includes a second capacitor 40 which may be called an empty tank reference capacitor since it supplies a constant rebalance current on the rebalance side of the bridge which balances out the empty tank capacitance of the tank unit 11. The function of capacitor 40 is more completely described in the copending John W. Bancroft application, Serial No. 181,747 filed August 28, 1950, now Patent 2,793,529 dated May 28, 1957.

The reference numeral 41 designates a calibration potentiometer for calibrating the fuel quantity measuring network means 30.

Referring now to the center of gravity measuring network means 31, the reference numeral 42 designates an alternating source of voltage in the form of a transformer having a primary winding 43 which is connected to an alternating source of voltage, and having a secondary winding 44 with a first terminal which is connected to ground at 45 and with a second and third output terminal which are of opposite phase with respect to ground 45. The reference numeral 46 designates a calibration potentiometer for the center of gravity measuring network means 31.

The fuel quantity measuring network means 30 and the center of gravity measuring network means 31 include a first amplifier 47 and a second amplifier 48 respectively. Amplifier 47 has a pair of input terminals 49 and 50, with the input terminal 50 connected to ground at 51. The output of amplifier 47 controls a two-phase motor 52 which in turn controls the position of potentiometer tap 37 to rebalance the rebalanceable capacitance type bridge. Amplifier 47 is a phase sensitive amplifier and functions to cause motor 52 to rotate in a first or a second direction depending upon the phase of the input signal applied to input terminals 49 and 50. Amplifier 47 may be of the type disclosed in the Albert P. Upton Patent 2,423,534.

The amplifier 48 has a first input terminal 53 and a second input terminal 54 which is connected to ground at 55. The output of amplifier 48 includes a relay 56 having a winding 57 and a switch blade 58 which engages a contact 59 upon the winding 57 being energized. Amplifier 48 is a phase sensitive amplifier of the type which energizes relay winding 57 when a signal of a first phase is supplied to the input terminals 53 and 54 and maintains the winding 57 de-energized when a signal of an opposite phase is applied to the input terminals.

The common or first electrodes of the tank units 11 and 12 are cycled between the fuel quantity measuring network means 30 and the center of gravity network means 31 by means of a relay 60 having a winding 61 and switch blades 62, 63 and 64. Relay winding 61 is shown in the de-energized condition wherein the switch blades 62, 63 and 64 engage contacts 65, 66 and 67 respectively. Upon energization of the winding 61, the switch blades 62, 63 and 64 disengage the contacts 65, 66 and 67 and move into engagement with the contacts 68, 69 and 70 respectively.

Energization of winding 61 of relay 60 is controlled by a motor driven timer 71. Motor driven timer 71 includes cycling switch means having switches 72 and 73. Operation of the switches 72 and 73 is controlled by a continuously energized motor 74 which controls the rotation of cams 75 and 76. The cams 75 and 76 have raised portions which close the switches 72 and 73. The cam 76 maintains the switch 72 closed for approximately one-fourteenth of each cycle of the cam. The cam 75 maintains the switch 73 closed for approximately one-twentieth of a cycle of rotation of the cam and the raised portions of the cams 75 and 76 are so related that the switch 72 is first closed, the switch 73 is then closed and held closed for approximately one-twentieth of a cycle and then opened, and the switch 72 is then opened. Upon the switch 72 being closed the relay winding 61 of a relay 60 is energized from a 28 volt direct current source designated generally by the reference numeral 139.

The apparatus of Figure 4 is shown with the common or first electrodes 16 and 20 of the tank units 11 and 12 respectively connected in parallel to the fuel quantity measuring network 30. In this mode of operation the fuel quantity measuring network 30 is effective to measure the total quantity of fuel in the tanks 9 and 10. Also, in this mode of operation an energizing circuit is completed for a relay 77 having a winding 78 and a switch blade 79 which moves into engagement with a contact 80 upon relay winding 78 being de-energized. Likewise, in this mode of operation, the second and third electrodes of the tank units 11 and 12 are connected in parallel by means of switch blade 63 engaging contact 66. As will be observed from Figure 4, the second electrodes of the tank units 11 and 12 are connected together as are the third electrodes of tank units 11 and 12. When the winding 61 of relay 60 is de-energized the switch blade 63 engages contact 66 and connects all four of the electrodes 17, 18, 21 and 22 of the tank units 11 and 12 together with the input terminal 49 of amplifier 47. Also, the first electrodes 16 and 20, or common electrodes of the tank units 11 and 12, are connected together and are connected to the calibration potentiometer 41 of the fuel quantity measuring network means 30. A fuel quantity measuring current can therefore be traced from the ground connection 35 through conductor 81, the lower portion of secondary 34, calibration potentiometer 41 and conductor 82. The circuit at this point takes two branches a first of which goes through conductor 83 and the second of which goes through conductor 84.

Tracing first the circuit through conductor 83, this circuit extends to contact 67 and switch blade 64 to conductor 85. At this point this circuit again branches into two circuits a first of which includes the first electrode 16 and the second electrode 17 of tank unit 11, conductors 86, 87 and 88 to the input terminal 49 of amplifier 47. The second branch of this circuit includes the first electrode 16 and the third electrode 18 of tank unit 11, conductors 89 and 90, contact 66 and switch blade 63, conductors 91, 92, 87 and 88 to the input terminal 49 of the amplifier 47.

Now tracing the second circuit which includes conductor 84, this circuit can be traced from contact 65 to switch blade 62, and conductor 93 to the first electrode 20 of tank unit 12. Here again, this circuit forms into two branches. The first of these branches includes first electrode 20 and second electrode 21 of tank unit 12, conductors 94, 92, 87 and 88 to the input terminal 49 of amplifier 47. The second of these branches includes first electrode 20 and third electrode 22 of tank unit 12, conductors 95 and 90, contact 66 and switch blade 63, conductors 91, 92, 87 and 88 to the input terminal 49 of amplifier 47.

In the above traced circuits, the magnitude of current flowing to the input terminal 49 of amplifier 47 is indicative of the quantity of fuel in the tank units 10 and 11 respectively. This current is summed so that the total resultant current is indicative of the total quantity of the fuel in the tank units 10 and 11. As has been described, the second and third electrodes of the tank units 11 and 12 are so constructed and arranged that when they are connected together and form in effect the single capacitor electrode in combination with the common capacitor electrode of the tank unit, the capacitance value of the resultant capacitor is indicative of the quantity of fuel in the tank units 10 or 11.

The rebalance current in the capacitance type rebalanceable bridge consists of an empty tank reference portion which flows through the capacitor 40 and a rebalance portion which flows through the capacitor 36. The empty tank reference portion can be traced from the ground connection 35 through conductor 81, the upper portion of secondary winding 34, capacitor 40, conductor 96, and conductor 88 to the input terminal 49 of amplifier 47. The rebalance current through capacitor 36 can be traced from ground connection 35 through the lower portion of potentiometer 38, potentiometer tap 37, capacitor 36, and conductor 88 to input terminal 49 of amplifier 47.

As is evident, the current flow through capacitors 36 and 40 is of an opposite phase to the current flow through the tank units 11 and 12, and depending upon the phase of the resultant signal applied to the input terminals 49 and 50 of amplifier 47, the motor 52 will be energized to move potentiometer tap 37 to either increase or decrease the current flow through capacitor 36 and thereby rebalance the capacitance type bridge. Potentiometer wiper 37 in cooperation with indicator scale 39 indicates the total quantity of fuel in the fuel tanks 9 and 10.

It should be noted at this point that in the fuel quantity measuring phase of operation of the apparatus of Figure 4 the input terminal 53 of amplifier 48 is likewise connected to the second and third electrodes of the tank units 11 and 12 respectively. Under certain conditions this may cause relay winding 57 to be energized. However, energization of winding 57, which causes switch blade 58 to engage contact 59, will have no effect at this time since the winding 78 of relay 77 is energized which causes switch blade 79 to disengage contact 80.

The center of gravity phase of operation of the apparatus of Figure 4 will now be described. As has been pointed out, the motor 74 of motor driven timer 71 is continuously energized and causes the cams 75 and 76 to rotate in counter-clockwise direction. The cams rotate at approximately 3 R. P. M. When the raised portion of the cam 76 has rotated to a proper position the switch 72 is closed. This completes an energizing circuit for the winding 61 of relay 60. This energizing circuit can be traced from ground connection 97 through relay winding 61, switch 72, conductors 98, 99 and 100, the 28 volt source, and ground connection 101. Energization of relay winding 61 causes switch blades 62, 63 and 64 to disengage contacts 65, 66 and 67 respectively and to move into engagement with contacts 68, 69 and 70 respectively. The switch blades 62 and 64 are effective to connect the common electrodes 16 and 20 of the tank units 11 and 12 respectively to the output terminals of an opposite phase with respect to ground of the secondary winding 44. The switch blade 63 in disengaging contact 66 is effective to break the connection which connects all four of the electrodes 17, 18, 21 and 22 and is effective to connect the second electrodes 17 and 21 of tank units 11 and 12 and also the input terminal 49 of amplifier 47 to ground at ground connection 102. This latter described operation of switch blade 63 insures that amplifier 47 will not be effective to control motor 52 during the center of gravity portion of the operation of the apparatus of Figure 4.

The tank units 11 and 12 are now effective to cause a first and a second current to flow to the input of amplifier 48, the resultant of which is indicative of the moment of fuel in the forward and aft fuel tanks 9 and 10 respectively. The current flow through the tank unit 11 can be traced from ground connection 45 through the upper portion of secondary winding 44, calibration potentiometer 46, contact 70 and switch blade 64, conductor 85, electrodes 16 and 18 of tank unit 11, and conductors 89 and 103 to the input terminal 53 of amplifier 48.

The current flow through tank unit 12 can be traced from ground connection 45 through the lower portion of the secondary winding 44, contact 68 and switch blade 62, conductor 93, electrodes 20 and 22 of the tank unit 12, and conductors 95 and 103 to the input terminal 53 of amplifier 48.

It can be seen that the two above traced currents are of opposite phase and are of a magnitude which is indicative of the respective moments of fuel in the forward and aft fuel tanks respectively. Amplifier 47 is so adjusted that if the first above traced current flow through tank unit 11 exceeds the current flow through tank unit 12 the relay winding 57 of relay 56 will remain de-energized.

However, if the reverse condition is true, that is, if the current through tank unit 12 exceeds that through tank unit 11, the winding 57 of relay 56 will be energized to cause switch blade 58 to engage contact 59.

As rotation of the cams 75 and 76 continues, the point is reached where the raised portion of cam 75 causes switch 73 to be closed. This completes an energizing circuit for a relay 104 having a winding 105 and switch blade 106 engaging a contact 107 when relay winding 105 is de-energized. This energizing circuit can be traced from ground connection 108 through winding 105, switch 73, conductors 99 and 100, 28 volt source, and ground connection 101. Energization of winding 104 of relay 105 causes winding 78 of relay 77 to be de-energized. This can be seen by tracing the circuit which initially energized winding 78. This circuit can be traced from ground connection 109 through winding 78, conductor 110, contact 111 and switch blade 112 of relay 113, conductor 114, contact 107 and switch blade 106, conductors 115, 99 and 100, 28 volt source, and ground connection 101.

De-energization of winding 78 causes switch blade 79 to engage contact 80. Switch blade 79 and contact 80 are located at an energizing circuit for winding 116 of relay 113. Relay 113 includes switch blades 112 and 117. Relay 113 is shown in the de-energized condition wherein switch blades 112 and 117 engage contacts 111 and 118 respectively. Upon energization of winding 116 the switch blades 112 and 117 disengage contacts 111 and 118 respectively and move into engagement with contacts 119 and 120 respectively. The contacts 118 and 120 and contacts 111 and 119 are overlapping contacts. That is, the switch blades 112 and 117 engage one of the contacts before disengaging the other upon coil 116 either being energized or de-energized.

As has been mentioned above, when the current through tank unit 11 is larger than the current through tank unit 12 the relay 56 remains de-energized. With such a condition existing, the moment of the fuel in the tank 9 is greater than the moment of fuel in the tank 10 and it is necessary to cause fuel to be drained from the forward fuel tank 9. This is accomplished by switch blade 117 engaging contact 118 of relay 113.

Until winding 57 of relay 56 is energized, winding 116 of relay 113 cannot be energized and switch blade 117 remains in engagement with contact 118. This completes an energizing circuit for the valve 13 associated with a forward fuel tank 9. This energizing circuit can be traced from ground connection 101 to 28 volt source, conductor 125, switch blade 117 and contact 118, conductor 122, valve 13 of Figure 1, and ground connection 123.

So long as the raised portion of cam 75 maintains switch 73 closed the center of gravity measuring network means 31 is effective to control operation of the fuel valves 13 and 14. For example, if while switch 73 is closed the fuel has been drained from the fuel tank 9 to the extent that the current through tank unit 12 now exceeds the current through tank unit 11, the relay winding 57 is energized to cause switch blade 58 to engage contact 59. An energizing circuit can now be traced for relay winding 116 from ground connection 101, 28 volt source, conductors 100 and 126, switch blade 58 and contact 59, conductor 127, contact 80 and switch blade 79, conductors 128 and 129, winding 116, and ground connection 130. Energization of winding 116 causes switch blades 112 and 117 to move to their energized position. When switch blade 117 engages contact 120 an energizing circuit is completed for valve 14 associated with the aft fuel tank 10 and the valve 13 is de-energized. The energizing circuit for valve 14 can be traced from ground connection 101 through the 28 volt source, conductor 125, switch blade 117 and contact 120, conductor 121, valve 14 of Figure 1, and ground connection 124. This causes fuel to be drained from the aft fuel tank 10 to cause the moment of the fuel in this fuel tank to be decreased.

Energization of winding 116 also causes movable switch blade 112 to engage contact 119. This completes a portion of a holding energizing circuit for winding 116 of relay 113. This holding energizing circuit is effective to insure that valve 14 will remain energized if the center of gravity control network means 31 calls for such action at the time that contact 73 opens until the switch 73 is again closed.

Assume for example, that relay 56 is energized at the time that contact 73 is opened by rotation of cam 75. As has been pointed out, when winding 57 is energized it is necessary to maintain the valve 14 associated with the aft fuel tank 10 energized to cause fuel to be drained from this tank. As switch 73 is open the winding 104 of relay 105 is de-energized and switch blade 106 moves into engagement with contact 107. This completes a holding energizing circuit for winding 116 of relay 113 which can be traced from ground connection 101 through the 28 volt source, conductors 100, 99 and 115, switch blade 106 and contact 107, conductor 114, switch blade 112 and contact 119, conductors 131 and 129, relay winding 116 and ground connection 130. This holding energizing circuit will be maintained closed until the switch 73 is again closed by operation of the cam 75. This insures that the winding 116 will be maintained energized during the fuel quantity measuring portion of the apparatus of Figure 4 to continuously cause fuel to be drained from the aft fuel tank 10 since this is the type of control which was last called for by the center of gravity measuring network means 31.

If it had been assumed that the relay winding 57 of relay 56 was de-energized at the time that switch 73 was opened by operation of cam 75, then the apparatus would assume the condition as shown in Figure 4. In this condition, the winding 78 of relay 77 is energized and causes de-energization of the winding 116 of relay 113, which in turn causes the holding circuit for winding 116 to be opened, thereby insuring that the valve 13 associated with the forward fuel tank 9 will be maintained energized during the fuel quantity measuring portion of the apparatus of Figure 4 to continuously cause fuel to be drained from this tank.

Referring now to the modification of Figure 5, this modification contemplates the utilization of capacitance type tank units similar to the tank units 11 and 12 of Figure 1 which are of the type disclosed in the Earl C. Bowar Patent 2,560,757. These tank units are shown in a schematic form in Figure 5 and are given the designation 311 and 312, indicating that they are associated with the forward and aft fuel tanks respectively. These tank units each consist of two capacitor electrodes and have a capacitance value which is indicative of the quantity of fuel in the fuel tanks 9 and 10 respectively.

In the modification of Figure 5, the reference numeral 150 designates generally a fuel quantity measuring network means while the reference numeral 151 designates generally a center of gravity measuring network means. The fuel quantity measuring network means 150 includes an alternating current source of voltage in the form of a transformer 152 having a primary winding 153 which is connected to a source of alternating current voltage, not shown. Transformer 152 likewise has a secondary winding 154 having a tap which is connected to ground at 155. The fuel quantity measuring network means 150 is a capacitance type rebalanceable bridge and includes a rebalance capacitor 156 connected to the wiper 157 of a rebalance potentiometer 158. The wiper 157 cooperates with a fuel quantity scale 159 to indicate the total quantity of fuel in the tanks 9 and 10. The network 150 likewise includes an empty tank reference capacitor 160 which performs a function similar to the empty tank reference capacitor 40 of the modification of Figure 4.

The fuel quantity measuring network 150 includes a first amplifier 161 having a pair of input terminals 162 and 163, with terminal 163 connected to ground at 164. The output of amplifier 161 controls a two phase motor 165 which is coupled to and controls the position of potentiometer tap 157 in accordance with the signal applied to the input terminals 162 and 163 of the amplifier. Amplifier 161 is identical to the amplifier 47 of the modification of Figure 4.

The center of gravity measuring network means 151 includes an alternating current voltage source in the form of a transformer 166 having a primary winding 167 connected to an alternating current source of voltage. Transformer 166 includes a secondary winding 168 with a tap connected to ground at 169. The network means 151 includes an amplifier 170 having input terminals 171 and 172, with the input terminals 172 being connected to ground at 173. The output of amplifier 170 controls a relay 174 having a winding 175 and switch blade 176 which engages a contact 177 upon winding 175 being energized.

The tank units 311 and 312 of Figure 5 are cycled between the fuel quantity measuring network means 150 and the center of gravity measuring network means 151 by means of a motor driven timer 377 which includes a continuously energized motor 178 and switches 179, 180 and 181. The switches of the motor driven timer are controlled by operation of the cams 182 and 183 which are rotated in a counter-clockwise direction by the motor 178.

The modification of Figure 5 also provides a manually operable switch 184 which has three positions, Aft., Fwd. and Automatic. In the Aft. position of the switch 184, the winding 185 of a relay 186 is continuously energized and causes its switch blade 187 to engage contact 188. Upon the winding 185 of relay 186 being de-energized, the switch blade 187 disengages contact 188 and engages contact 189. The contacts 188 and 189 are over-lapping in their operation. That is, the switch blade 187 engages one of the contacts before disengaging the other contact upon moving either to the energized or de-energized position.

The contact 189 is connected to conductor 122 while the contact 188 is connected to the conductor 121. The reference numerals 121 and 122 are identical to those used in Figures 1 and 4 since it is intended that the operation of relay 186 of Figure 5 will control the energization of the valves 13 and 14 of Figure 1.

The energizing circuit for winding 185 of relay 186 can be traced from ground connection 190 through the 28 volt source, conductors 191, 192 and 193, switch 184, conductors 194 and 195, winding 185 and ground connection 196. Energization of this relay causes valve 14 to be continuously energized.

When the switch 184 is moved to the Fwd. position, the winding 185 of relay 186 is de-energized and this causes valve 13 of Figure 1 to be continuously energized. In this manner, operation of the manually operable switch 184 between the Aft. and Fwd. position allows manual control of the flow of fuel from the forward and aft fuel tanks.

With manual switch 184 in the Aft. or Fwd. position, the winding 224 of relay 206 cannot be energized. This insures that tank units 311 and 312 are continuously connected to the fuel quantity measuring network means 150.

With the switch 184 in the automatic position, automatic control of the center of gravity of the aircraft is maintained by automatic control of the energization of the valves 13 and 14 as will be described.

The apparatus of Figure 5, as shown, is in the fuel quantity measuring mode of operation. That is, the tank units 311 and 312 are connected in parallel in the measuring branch of the fuel quantity measuring network means 150. This can be been by tracing a current flow circuit from the ground connection 155 through the upper portion of the secondary winding 154, calibration potentiometer 269, and conductor 201. At this point the circuit branches into two branches which include conductors 202 and 203 respectively.

Tracing the first branch the circuit can be traced through conductor 203, contact 204 and switch blade 205 of a relay 206, conductor 207, tank unit 311, conductors 208 and 209, contact 210 and switch blade 211 of relay 206, conductors 212, 213 and 214 to the input terminal 162 of amplifier 161.

The second branch circuit can be traced through conductor 202, contact 215 and switch blade 216 of relay 206, conductor 217, tank unit 312, conductors 218 and 209, contact 210 and switch blade 211 of relay 206, and conductor 212, 213 and 214 to the input terminal 162 of amplifier 161. From these circuits it can be seen that the total magnitude of current flowing to the input of amplifier 161 is indicative of the total quantity of fuel in the tanks 9 and 10.

The current flow circuit through the rebalance capacitor 156, which is of an opposite phase to the above traced currents, can be traced from ground connection 155 through the upper portion of the potentiometer 158, potentiometer tap 157, rebalance capacitor 156, and conductor 214 to the input terminal 162 of amplifier 161. The current flow circuit through the empty tank reference capacitor 160, which is likewise of an opposite phase to the first above traced currents, can be traced from ground connection 155, through the lower portion of the secondary winding 154, capacitor 160, and conductors 213 and 214 to the input terminal 162 of amplifier 161. Amplifier 161 is effective to compare the current flowing in the above traced circuits and to cause motor 165 to be energized to position potentiometer tap 157 to cause the capacitance bridge to be balanced. In the balanced condition the potentiometer wiper 157 in cooperation with the indicator scale 159 indicates the total quantity of fuel in the tanks 9 and 10.

Also, in this mode of operation of the apparatus of Figure 5, the input terminal 171 of the amplifier 170 associated with the center of gravity measuring means 151 is connected to ground. This can be seen by tracing a circuit from input terminal 171 through conductor 220, switch blade 221 and contact 222 to ground connection 223. This insures that amplifier 170 will be effective to maintain winding 175 of relay 174 de-energized during this mode of operation of the apparatus of Figure 5.

It will be noted that the switch blades and contacts of the relay 206 are connected in controlling relation to the circuits as above traced which include the tank units 311 and 312. The energization of the winding 224 of relay 206 is controlled by switch 179 of motor driven timer 177. It can be seen from the raised portion of the cam 182 that the relay winding 224 of relay 206 will be energized for approximately one-half of a cycle of operation of the motor driven timer 177. It will now be assumed that cam 182 has rotated to the position where switch 179 is closed to energize winding 224 of relay 206. This energizing circuit can be traced from ground connection 225 through winding 224, conductor 226, switch 184, switch 179, conductors 227 and 191, 28 volt source and ground connection 190.

Energization of winding 224 of relay 206 causes switch blades 205, 216, 211 and 221 to disengage contacts 204, 215, 210 and 222 respectively and to move into engagement with contacts 228, 229, 230 and 231 respectively.

When switch blade 211 moves into engagement with contact 230, the input terminal 162 of amplifier 161 is connected to ground. This can be seen by tracing a circuit from terminal 162 through conductors 214, 213 and 212, switch blade 211 and contact 230, conductor 232, and ground connection 223. This connection of the input terminal 162 of amplifier 161 to ground insures that the motor 165 will not be effective to position potentiometer tap 157 during the center of gravity portion of the cycle. Potentiometer tap 157 remains stationary at the position at which it was when winding 224 of relay 206 was energized.

The switch blades 205, 216 and 221 are effective in their energized positions to connect the tank units 311 and 312 on opposite sides of a capacitance bridge in the center of gravity measuring means 151 and to connect the tank units to the input terminal 171 of amplifier 170.

The current flow circuit through tank unit 311 can be traced from ground connection 169 through the lower portion of secondary winding 168, conductor 240, contact 228 and blade 205, conductor 207, tank unit 311, conductors 208 and 209, contact 231 and switch blade 221, and conductor 220 to the input terminal 171 of amplifier 170.

The current flow circuit through tank unit 312 can be traced from ground connection 169 through the upper portion of transformer winding 168, conductor 241, contact 229 and switch blade 216, conductor 217, tank unit 312, conductors 218 and 209, contact 231 and switch blade 221, and conductor 220 to the input terminal 171 of amplifier 170.

It can be seen that the currents flowing in the two above traced circuits are of opposite phase. Amplifier 170 is so constructed and arranged that when the current flow through tank unit 311 exceeds the current flow through tank unit 312 the relay winding 175 of relay 174 remains de-energized. However, when the current flow through tank unit 312 is greater than the current flow through tank unit 311 this relay winding is energized.

It will be assumed in the first instance that the current flow through tank unit 312 is greater than the current flow through tank unit 311, thereby causing winding 175 of relay 174 to be energized. This causes switch blade 176 to engage contact 177. This completes a portion of the energizing circuit for winding 250 of relay 251. However, this energizing circuit remains open at contact 180 which is controlled by cam 183 of motor driven timer 177.

As the cam 183 continues to rotate, the switch 181 is opened and the switch 180 is closed. This completes an energizing circuit for winding 250 which can be traced from ground connection 252 through winding 250, conductor 253, switch 180, conductor 254, contact 177 and switch blade 176, conductors 255, 256, 192 and 191, 28 volt source, and ground connection 190. Energization of winding 250 of relay 251 causes switch blade 260 to engage contact 261. This completes an energizing circuit for winding 185 of relay 186. This energizing circuit can be seen by tracing a circuit from ground connection 196 through winding 185, conductors 195, 265 and 266, contact 261 and switch blade 260, conductors 267, 256, 192 and 191, and 28 volt source to ground connection 190.

Energization of winding 185 of relay 186 causes switch blade 187 to engage contact 188 thereby energizing the valve 14 associated with the aft fuel tank 10. This causes fuel to be drained from the fuel tank 10 and thereby reduces the moment of the fuel in this tank. This in turn reduces the magnitude of current flowing through the tank unit 312.

In this modification, means is also provided whereby the respective valve 13 or 14 which was energized by operation of the center of gravity control means 151 will remain energized until the center of gravity control means 151 is again effective to control the relay 174. In other words, when switch 179 of motor driven timer 177 is in the open condition, as shown in Figure 5, the apparatus is functioning to measure the quantity of fuel in the tanks 9 and 10 and the center of gravity measuring apparatus 151 is not effective. However, before switch 179 opens the cam 183 is effective to open switch 180 and to close switch 181. Switches 180 and 181 are overlapping in operation and before switch 180 is opened, switch 181 is closed. This completes a holding energization circuit for winding 250 of relay 251 which in turn maintains the winding 185 of relay 186 energized to thereby maintain the valve 14 energized. The holding energizing for winding 250 can be traced from ground connection 252 through coil 250, conductor 253, switch 181, conductors 280 and 266, contact 261 and switch blade 260, conductors 267, 256, 192 and 191, 28 volt source, and ground connection 190. The energizing circuit for winding 185 of relay 186 can be traced from ground connection 196 through relay winding 185, conductors 195, 265 and 266, contact 261 and switch blade 260, conductors 267, 256, 192 and 191, 28 volt source, and ground connection 190.

As the cams 182 and 183 continue to rotate, the switch 179 is opened and this de-energizes relay winding 224 of relay 206. Switch blade 221 of relay 206 in the de-energized condition connects input terminal 171 of amplifier 170 to ground and thereby causes winding 175 of relay 174 to be de-energized. However, this does not de-energize the winding 185 of relay 186 due to the above traced energizing circuit which therefore maintains the valve 14 energized to continuously drain fuel from the tank 10.

It will now be assumed that when the motor driven timer 177 again functions to close switches 179 and 180 and to open switch 181 the current flow through the tank unit 311 is greater than the current flow through the tank unit 312. This condition is indicative of the moment of the fuel in the forward tank 9 now being greater than the moment of the fuel in the aft tank 10 and it is therefore necessary to de-energize the valve 14 and to energize the valve 13. As has been mentioned, when such a condition exists the winding 175 of relay 174 remains de-energized. With this relay de-energized and with the switch 181 open the winding 250 of relay 251 is de-energized and this in turn causes the winding 185 of relay 186 to be de-energized. Therefore, the switch blade 187 engages contact 189 and causes valve 13 to be energized.

As operation of the motor driven timer 177 continues, the switch 180 is opened and the switch 181 is closed. However, since winding 250 of relay 251 was not energized at this time, the winding 185 of relay 186 will remain de-energized and cannot be again energized until the motor driven timer 177 again closes contact 180, it being recognized that switch 179 will be closed at this time and the center of gravity measuring network means 151 will be again effective to energize relay winding 175 if the condition of moment unbalance of fuel in the tanks 9 and 10 warrant that this relay winding be energized.

It can therefore be seen that I have provided an improved control apparatus which functions to both measure the total quantity of fuel in the tanks 9 and 10 and to control the center of gravity of the aircraft by controlling the energization of the valves 13 and 14. These and other modifications of the invention will be apparent to those skilled in the art and it is intended that the scope of my invention be limited solely by the appended claims.

I claim as my invention:

1. Apparatus for use with an aircraft having a first and a second fuel tank located on opposite sides of an axis of the aircraft comprising; first and second capacitance type sensing means arranged to be positioned in the first and second fuel tanks respectively; a first bridge network having a first transformer secondary winding with two end terminals and a tap connected to ground, a rebalance capacitor connected in a variable voltage connection to one end terminal of said first secondary winding, a first amplifier having a pair of input terminals, means connecting one of said amplifier input terminals to said rebalance capacitor and the other input terminal to ground, and a motor connected to the output of said amplifier and arranged to control a fuel quantity indicator and to control said variable voltage connection; a second bridge network having a second transformer secondary winding with two end terminals and a tap connected to ground, a second amplifier having a pair of input terminals one of which is connected to ground, and means to control the draining of fuel from the first and second fuel tanks connected to be controlled by the output of said second amplifier; a timer having switch means cycled thereby, means controlled by said switch means in a first position connecting said first and second sensing means in parallel to the other end terminal of said first transformer secondary and to said one input terminal of said first amplifier, means controlled by said switch means in a second position connecting said first and second sensing means in a series circuit to the end terminals of said second transformer secondary, and means connecting the other input terminal of said second amplifier to the common connection of said first and second sensing means.

2. Apparatus for use with a aircraft having first and second fuel tanks located on opposite sides of an axis about which it is desired to control the center of gravity of the aircraft, comprising; first and second fuel quantity sensing means arranged to be positioned in the first and second fuel tanks respectively; fuel quantity measuring network means; center of gravity measuring network means; switch means; means controlled by said switch means periodically connecting said first and second fuel quantity measuring means first to said fuel quantity measuring network means to cause the output of said fuel quantity measuring network means to be indicative of the total quantity of fuel in the first and second fuel tanks, and secondly connecting said first and second fuel quantity sensing means to said center of gravity measuring network means to cause the output of said center of gravity measuring network means to be indicative of the moment of the fuel in the first and second fuel tanks with respect to the axis of the aircraft.

3. Apparatus for use with a craft having a first and a second controllable load each of which is located on opposite sides of an axis about which it is desired to control the center of gravity of the craft, comprising; first and second sensing means arranged to be associated with the first and second controllable loads and to measure the magnitude of the first and second controllable loads respectively; load measuring means; center of gravity measuring means; switch means; means controlled by said switch means selectively connecting said first and second sensing means first to said load measuring means to cause the output of said load measuring means to be indicative of the total weight of the first and second loads, and secondly connecting said first and second loads, sensing means to said center of gravity measuring means to cause the output of said center of gravity measuring means to be indicative of the condition of moment balance of the first and second loads with respect to the axis of the craft; and means controlled by the output of said center of gravity measuring means to control the magnitude of said first and second loads.

4. Apparatus for use with a craft having a first and a second controllable load located on opposite sides of an axis about which it is desired to control the center of gravity of the craft, comprising: first and second capacitance type sensing means arranged to be associated with the first and second controllable loads respectively and to have a capacitance value which is indicative of the magnitude of the first and second loads respectively; an alternating source of voltage, a first amplifier having an input circuit; a second source of alternating voltage having a point of reference potential and having a pair of output terminals which are of opposite phase with respect to the point of reference potential, a second amplifier having an input circuit including a pair of input terminals one of which is connected to the reference potential; cyclically controlled switch means; means controlled by said switch means selectively connecting said first and second capacitance type sensing means first in parallel and connecting said parallel connected capacitance type sensing means in a series circuit including said first source of alternating voltage and the input circuit of said first amplifier such that the output of said first amplifier is indicative of the total magnitude of the first and second loads; said switching means secondly connecting said first and second capacitance type sensing means in series to the two output terminals of said second source of alternating voltage, means connecting the other input terminal of said second amplifier to the connection of said first and second capacitance type sensing means to thereby cause the output of said second amplifier to be indicative of the moment of the first and second loads with respect to the axis of the craft; and means controlled by the output of said second amplifier to control the magnitude of the first and second loads.

5. Apparatus for use with an aircraft having a first and second fuel tank located on opposite sides of an axis of the aircraft comprising; first and second impedance type fuel quantity sensing means associated with the first and second tanks respectively and arranged to have an impedance value which is indicative of the quantity of fuel in the first and second fuel tanks respectively; fuel quantity measuring means; center of gravity measuring means; cyclically operable switch means; means controlled by said switch means connecting said first and second impedance type sensing means to said fuel quantity measuring means to cause the fuel quantity measuring means to measure the total quantity of fuel in the first and second tanks, said switch means then connecting said first and second impedance type sensing means to said center of gravity measuring means to thereby measure the moment balance of the fuel in the first and second fuel tanks.

6. Apparatus for use with an aircraft having a first and second fuel tank located with respect to an axis about which it is desired to control the center of gravity of the aircraft, comprising; a first and a second capacitance type tank unit associated with the first and second fuel tanks respectively, said first and second capacitance type tank units each having three capacitor electrodes extending throughout a portion of the height of the first and second fuel tanks, the three electrodes of each of said tank units including a common electrode and a second and third electrode which are characterized so that when they are connected in parallel the capacitance value of the tank unit is indicative of the quantity of fuel in the respective fuel tank, and the capacitance value of the common electrode and the second electrode of the tank unit being indicative of the moment of the fuel in the tank with respect to the axis of the aircraft; a first source of alternating voltage having a first terminal connected to ground and having a second terminal, a first amplifier having a pair of input terminals one of which is connected to ground; a second source of alternating voltage having a terminal connected to ground and having a first and a second terminal which are of opposite phase with respect to ground, a second amplifier having a pair of input terminals a first of which is connected to ground; cycling switch means; means controlled by said cyling switch means selectively connecting the common electrodes of said first and second tank units in parallel to the second output terminal of said first source of alternating voltage and with said second and third electrodes of said first and second tank units connected in parallel and to the second input terminal of said first amplifier to thereby cause the output of said first amplifier to be indicative of the total quantity in the first and second fuel tanks; said switch means secondly connecting said common electrodes of said first and second tank units to the second and third output terminals of said second source of alternating voltage and connecting said second electrode of said first and second tank units to ground, and connecting said third electrodes of said first and second tank units to the second input terminal of said second amplifier to thereby cause the output of said second amplifier to be indicative of the condition of moment balance of the fuel in the first and second fuel tanks with respect to the axis of the aircraft.

7. Apparatus for use with an aircraft having a first and second fuel tank located on opposite sides of an axis about which it is desired to control the center of gravity of the aircraft, comprising; first and second capacitance type fuel quantity measuring means arranged to be located in the first and second fuel tanks respectively; a first source of alternating voltage having the first grounded terminal and a second terminal, a first amplifier having a pair of input terminals a first of which is connected to ground; a second source of alternating voltage having a grounded terminal and second and third terminals of opposite phase with respect to ground, a second amplifier having a pair of input terminals a first of which is connected to ground; cycling switch means; means controlled by said cycling switch means connecting said first and second capacitance type tank units in parallel and connecting the parallel connected tank units in series with the second output terminal of said first source of alternating voltage and the second input terminal of said first amplifier to thereby cause the output of said first amplifier to be indicative of the total quantity of fuel in the first and second fuel tanks, said cycling switch means secondly connecting said first and second capacitance type tank units to the second and third output terminals of said second source of alternating voltage and to the second input terminal of said second amplifier to thereby cause the output of said second amplifier to be indicative of the center of gravity of the fuel in the first and second fuel tanks.

8. Apparatus for use with an aircraft having a first and a second fuel tank located with respect to an axis of the aircraft comprising; first and second impedance type fuel quantity sensing means associated with the first and second fuel tanks respectively and arranged to have an impedance value which is indicative of the quantity of fuel in the first and second fuel tanks; fuel quantity measuring means; center of gravity measuring means; a timer having a first two position switch and a second switch; means controlled by the first switch of said timer in the first position connecting said first and second impedance type sensing means to said fuel quantity measuring means to thereby cause the fuel quantity measuring means to measure the total quantity of fuel in the first and second fuel tanks, said last named means connecting said first and second impedance type sensing means to said center of gravity measuring means when the first switch of said timer is in its second position to thereby cause the output of the center of gravity measuring means to be indicative of the moment balance of the fuel in the first and second fuel tanks with respect to the axis of the aircraft; means controlled by said center of gravity measuring means to control the draining of fuel from the first and second fuel tanks in a manner to restore the center of gravity of the aircraft; and means controlled by said second switch of said timer to insure that the draining of fuel from the first and second fuel tanks as called for by the center of gravity measuring means when said first switch of said timer is in said second position will be maintained when said first switch of said timer is in said first position wherein said first and second impedance type sensing means are connected to the fuel quantity measuring means.

9. Apparatus for use with an aircraft having first and second fuel tanks located on opposite sides of an axis of the aircraft comprising: a first sensing means associated with the first fuel tank giving a first signal indicative of the quantity of fuel in the first tank and giving a second signal indicative of moment of the fuel in the first fuel tank about the axis; a second sensing means associated with the second fuel tank giving a first signal indicative of the quantity of fuel in the second tank and giving a second signal indicative of the moment of the fuel in the second tank about the axis; first network means connected to said first and second sensing means and responsive to the combined first signals from said first and second sensing means to indicate the total quantity of fuel in the first and second tanks; and second network means connected to said first and second sensing means responsive to the combined second signals from said first and second sensing means to control the quantity of fuel in the first and second tanks to thereby maintain the center of gravity of the aircraft.

10. Apparatus for use with a craft having first and second controllable loads each of which is located on opposite sides of an axis about which is desired to control the center of gravity of the craft, comprising: a first sensing means being associated with the first load and giving a first signal indicative of the magnitude of the first load and a second signal indicative of the moment of the load with respect to the axis; a second sensing means being associated with the second load and giving a first signal indicative of the magnitude of the second load and a second signal indicative of the moment of the second load with respect to the axis; indicating means connected to said first and second sensing means and responsive to the combined first signals from said first and second sensing means to indicate the total magnitude of the load; and means connected to said first and second sensing means and responsive to the combined second signals from said first and second sensing means to control the magnitude of the loads to thereby maintain the center of gravity of the craft.

References Cited in the file of this patent

UNITED STATES PATENTS

| | | |
|---|---|---|
| 2,478,671 | Smith | Aug. 9, 1949 |
| 2,509,629 | De Giers et al. | May 30, 1950 |
| 2,672,880 | Hermanson | Mar. 23, 1954 |
| 2,759,424 | Defibaugh et al. | Aug. 21, 1956 |